US005215131A

United States Patent [19]

Poy

[11] Patent Number: 5,215,131

[45] Date of Patent: Jun. 1, 1993

[54] AUTOMATIC LIQUID DELIVERY SYSTEM

[76] Inventor: George L. Poy, 4278 Westover Dr., Orchard Lake, Mich. 48323

[21] Appl. No.: 791,511

[22] Filed: Nov. 14, 1991

[51] Int. Cl.[5] .................... G01N 1/14

[52] U.S. Cl. .................... 141/130; 141/103; 141/105; 141/234; 141/387; 422/100

[58] Field of Search .................... 141/130, 100, 103, 104, 141/105, 248, 234, 387, 388, 250; 422/100

[56] References Cited

U.S. PATENT DOCUMENTS

| | | | |
|---|---|---|---|
| 3,428,072 | 2/1969 | Welch . | |
| 3,563,263 | 2/1971 | Benson . | |
| 3,901,084 | 8/1975 | Brailsford | 141/130 X |
| 3,915,652 | 10/1975 | Natelson | 141/130 X |
| 3,924,471 | 12/1975 | Singer | 141/130 X |
| 3,974,864 | 8/1976 | Fournier et al. . | |
| 4,199,013 | 4/1980 | Reich et al. . | |
| 4,252,253 | 2/1981 | Shannon . | |
| 4,422,151 | 12/1983 | Gilson | 141/130 X |
| 4,553,573 | 11/1985 | McGarrah . | |
| 4,598,810 | 4/1986 | Shore et al. . | |
| 4,665,758 | 5/1987 | Schaarschmidt | 141/130 X |
| 4,812,629 | 3/1989 | O'Neil . | |
| 4,889,433 | 12/1989 | Pratt . | |

*Primary Examiner*—Ernest G. Cusick

*Attorney, Agent, or Firm*—Barnes, Kisselle, Raisch, Choate, Whittemore & Hulbert

[57] ABSTRACT

A system for automatically and accurately transferring/transporting quantities of liquids from bulk storage source tanks to mixing/processing tanks with minimal contamination of the liquids or to the surrounding environment. The several bulk storage source tanks are individually connected by associated pumps and control valves to a corresponding plurality of first couplers fixedly mounted on a terminal panel in an array of predetermined geometry. A second coupler, adapted for selective mating engagement with the first couplers, is carried by a robotic arm that is movably mounted on a support base for bringing the second coupler selectively into registry and coupling engagement with any one of the first couplers. Motion of the arm and engagement/disengagement of the couplers, as well as operation of the several storage source pumps and appropriate control valves, are all controlled by a process controller/computer, which also receives an input from a mass flow meter for determining quantity of liquid transferred to the mixing/processing tank from each storage tank. The couplers are of the locking dry-break type to minimize spillage or leakage during the coupling/decoupling and liquid transport operation.

16 Claims, 3 Drawing Sheets

AUTOMATIC LIQUID DELIVERY SYSTEM

The present invention is directed to a system for quantitatively delivering a series of differing liquids to a processing tank or the like, and more particularly to a mechanism for automatically and sequentially connection to each of the liquid sources in sequence.

BACKGROUND AND OBJECTS OF THE INVENTION

There are many applications in industry where a variety of liquids are to be mixed in accordance with a predetermined recipe or formula. Examples of such industries include paint, pharmaceutical and health care, and food and beverage industries. In such applications, the conventional options of conveying the variety of liquids are:

1. measuring the variety of liquids into a portable liquid transport and discharging them into the processing tank for mixing;

2. by manually valving at the source tank or common header, measuring the variety of liquids and conveying them through suitable conduits into the processing tank;

3. a mixing or processing tank is to be connected to a series of liquid source tanks and for a time necessary to obtain transfer of a desired quantity of liquid from each source tank to the mixing or processing tank.

Typically, the above options are carried out by one or more operators. Mixing of the liquids at the processing tank may be on a batch-type basis, or may be in a continuous operation in a static mixer or the like.

A general object of the present invention is to provide a liquid delivery system of the described character in which sequential connection of the mixing or processing tank to the several source tanks is accomplished automatically, without operator intervention, and in such a way as to avoid either contamination of the liquids from malfunctioning valves leading directly to a process tank or to a common header with a previous liquid passing through the common header on the one hand, or leakage of the liquid to the surrounding environment on the other. Another and more specific object of the present invention is to provide a liquid delivery system of the described character that is economical to implement, and that provides reliable service over an extended operating lifetime.

SUMMARY OF THE INVENTION

The present invention contemplates a system for automatically and accurately transferring/transporting quantities of liquids from bulk storage tanks to mixing/processing tanks with minimal contamination of the liquids or the surrounding environment. The several bulk storage tanks are individually connected by associated pumps to a corresponding plurality of first connectors or couplers fixedly mounted on a terminal board or panel in an array of predetermined geometry. A second connector or coupler, adapted for selective mating engagement with each of the first couplers, is carried by a robotic arm that is movably mounted on a support base for bringing the second coupler selectively into registry and coupling engagement with any one of the first couplers. Motion of the arm and engagement/disengagement of the couplers, as well as operation of appropriate automatic control valves and the several source tank pumps, are all controlled by a process controller/computer, which also receives an input from a mass flow meter or the like for determining quantity of liquid transferred to the mixing/processing tank. The couplers preferably are of the dry-break type to minimize spillage or leakage during the coupling operation.

In one embodiment of the invention, the planar array of first couplers on the terminal board comprises a rectilinear array in which the couplers are disposed in rows and columns. The robotic arm is mounted for translation along the support in a direction parallel to the coupler rows, and the second coupler is mounted for translation lengthwise of the arm in a direction parallel to the coupler columns. The controller is programmed with the x-y coordinates of the couplers to which connection is to be made in turn, and is connected to motors for suitably translating the arm on the support base and the coupler on the arm. The motors may comprise electric servo motors, linear or rotary actuators, or multi-motor/multi-axis mechanisms, etc. In another embodiment of the invention, the first couplers are mounted in an arcuate array, and the robotic arm is driven by its associated motors or other mechanisms to pivot about a fixed axis on the support base such that the second coupler carried by the arm traverses the arcuate array of couplers.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
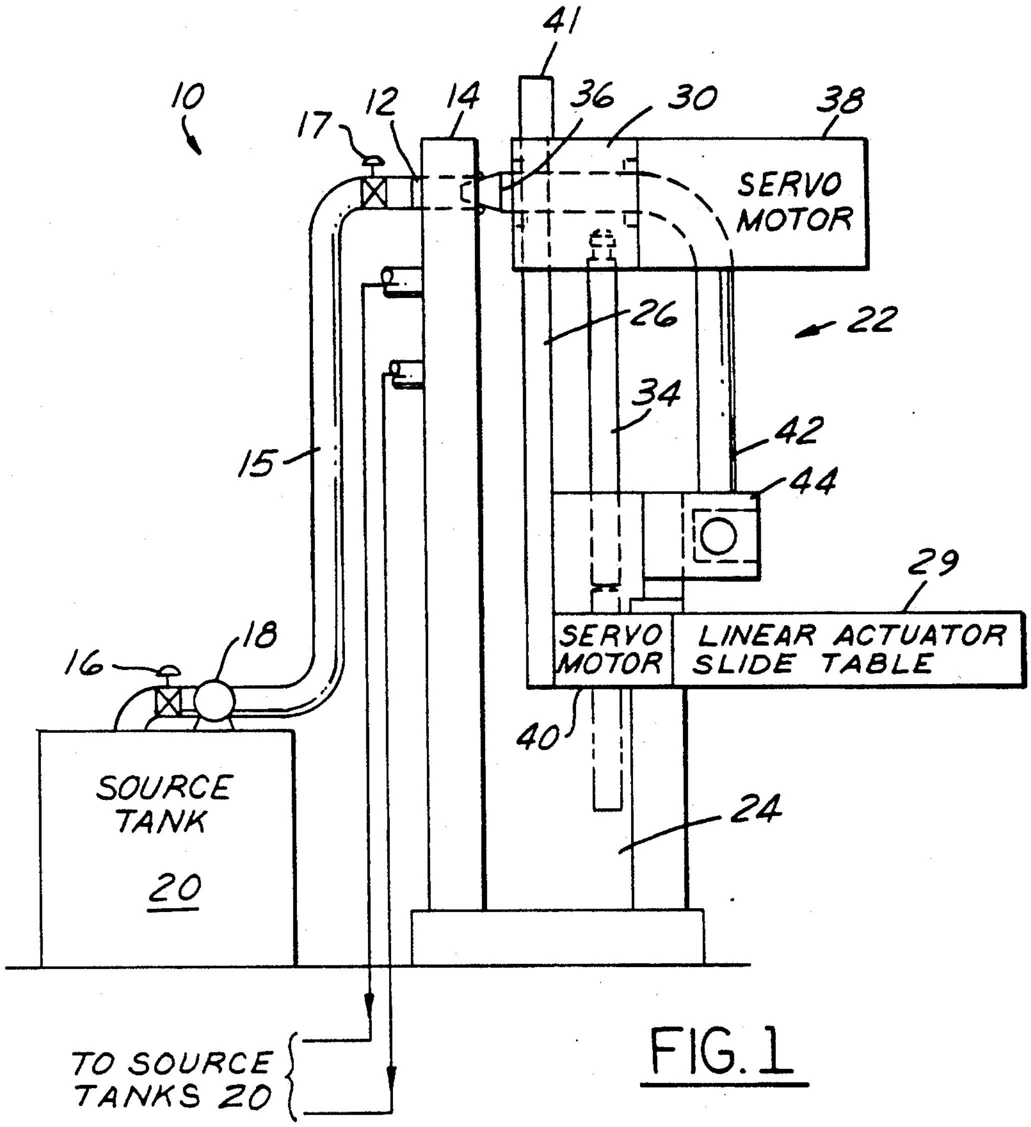
FIG. 1 is a schematic diagram of one presently preferred embodiment of the invention illustrated in side elevation.
Figure 2:
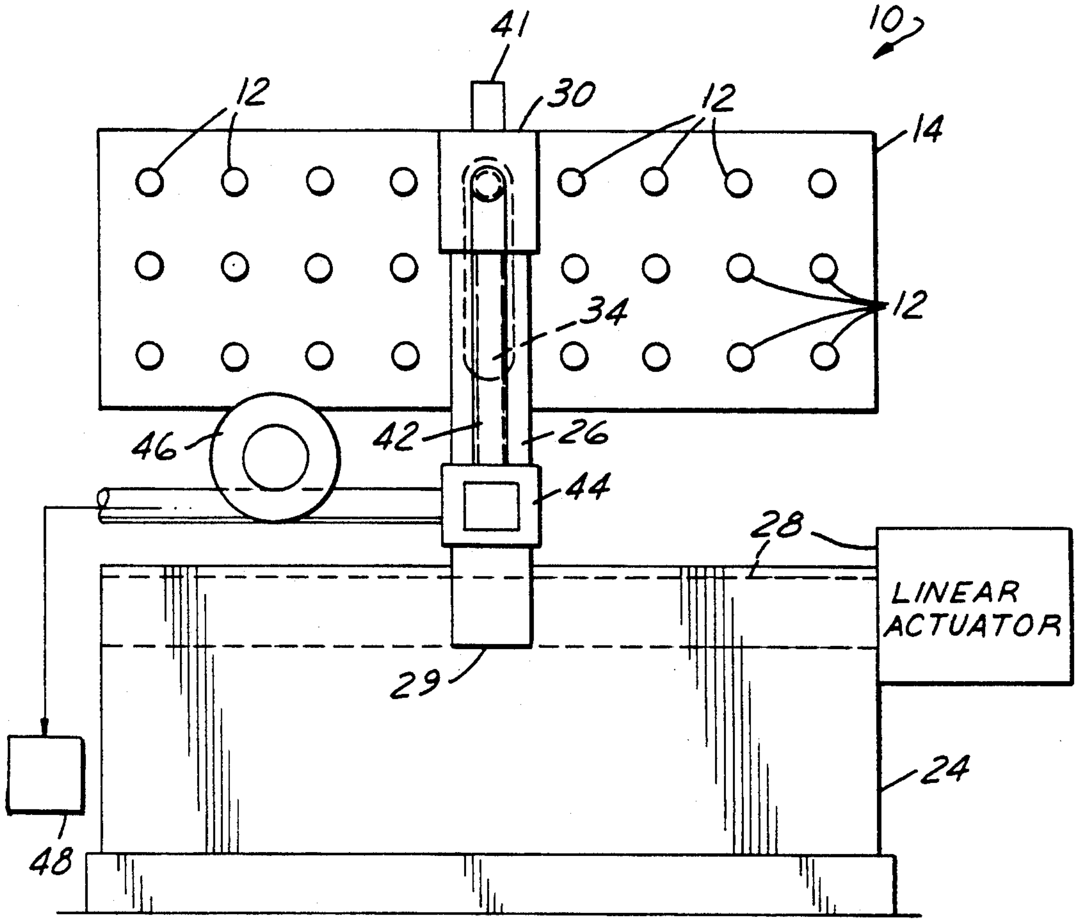
FIG. 2 is an end elevational view of the embodiment of the invention schematically illustrated in FIG. 1.
Figure 3:
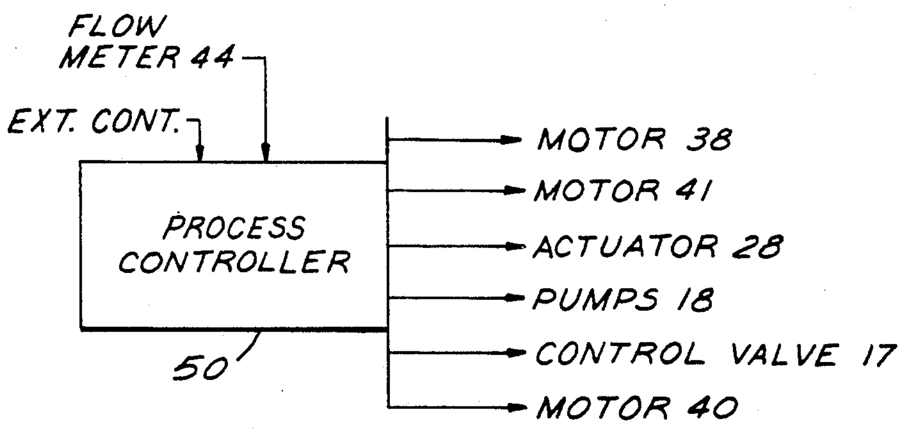
FIG. 3 is a functional block diagram of the control mechanism in accordance with the preferred embodiment of the invention.

FIGS. 1-3 illustrate a liquid delivery system 10 in accordance with a presently preferred embodiment of the invention as comprising a plurality of connectors or couplers 12 fixedly mounted on a planar terminal panel or support 14 in a rectilinear row-and-column array. Each coupler 12 is individually connected by piping 15, to a control valve 17, a controlled pump 18 and a manual valve 16 to an associated source tank 20. The plurality of tanks 20 may be located at any desired location adjacent to or remotely of panel 14. It is also contemplated, and within the scope of the present invention, to provide tanks 20 at an elevated position, such as on the roof of a building, and to replace the several pumps 18 with fluid or electrically operated control valves for providing the liquid to the couplers 12 on panel 14 solely by force of gravity and/or assisted by pressure in the system.

A robotic mechanism 22 is positioned adjacent to panel 14 for selective connection to the couplers 12. Mechanism 22 comprises a fixed base 24 from which a guide arm 26 vertically projects adjacent and parallel to panel 14. Guide arm 26 is carried on a linear actuator slide table 29 for translation in a direction parallel to the rows of couplers 12 on panel 14 under control of a linear actuator 28, which is mounted in fixed position on base 24 and suitably coupled to the lower end of guide arm 26. A carrier 30 is mounted for translation lengthwise of guide arm 26—i.e., vertically parallel to the columns of couplers 12 on panel 14 of base 24—under control of a servo motor 40 affixed to the lower end of guide arm 26 and a lead screw 34 or other mechanism that connects carrier 30 to servo motor 40. A coupler 36 is mounted on carrier 30 at a position for opposed alignment with couplers 12 on panel 14. A servo motor 38 is also mounted on carrier 30 for selectively extending coupler 36 into engagement with a coupler 12 aligned therewith, or retracting coupler 36 from engagement with aligned coupler 12. A second servo motor 41 is also mounted on carrier 30 for locking coupler 36 in engagement with an aligned coupler 12. Preferably, couplers 12,36 comprise so-called dry-break couplers, of which suitable types are marketed by any number of other companies. The several couplers 12 may comprise of adapters, and coupling 36 may comprise of a coupler with locking mechanism connected to servo motor 41.

Coupler 36 is connected by a flexible or fluted conduit 42 to a mass flow meter 44 mounted on a base of guide arm 26. Flow meter 44 is then connected by an extensible conduit, such as a hose reel 46, to one or more mixing or processing tanks 48. Alternatively, a mirror image of system 10 (FIG. 2) can be applied to a plurality of processing tanks whereby, through computer instructions, a specific processing tank 48 can be connected to receive the liquids of the programmed recipe. In another version, by merging and integrating the operation of two or more systems 10, operating simultaneously, and yet independently via computer logic, two or more processing tanks 48 can be filling at the same time with the same or different recipes, each according to its own system 10 and process controller. An electronic process controller 50 (FIG. 3) receives an input from flow meter 44, and provides suitable control outputs to pumps 18, automatic control valve actuator 28 and motors 38, 40 and 41. Process controller 50, which preferably comprises a suitable microprocessor-based controller, may also receive control signals from an external source (not shown) for down-loading and/or modifying suitable programs for connecting processing tank 48 to the several source tanks 20 via robotic mechanism 22 in sequence according to a desired batch recipe.

For example, a recipe may first call for connection to a first source tank and transfer of three hundred fifty-five pounds of processing liquid therefrom to the mixing tank 48. The x-y coordinates of the coupler 12 on panel 14 associated with this particular source tank is obtained from the memory of process controller 50, which then operates linear actuator 28 to the corresponding x-coordinate and servo motor 40 to the corresponding y-coordinate. When motion of guide arm 26 and carrier 30 have stopped at the x-y coordinate of the desired coupler 12, servo motor 38 is actuated to engage coupler 36 with the aligned coupler 12, and servo motor 41 is then actuated to lock the couplers in engagement. After a suitable delay, automatic control valve 17 and pump 18 associated with the particular source tank 20 is activated by process controller 50, and flow meter 44 is monitored until three hundred fifty-five pounds of liquid have been transferred to the processing tank. Automatic control valve 17 and pump 18 are then turned off.

After another delay, servo motor 41 is activated to unlock coupler 36, and servo motor 38 is activated to withdraw coupler 36 from engagement with aligned coupler 12. Since couplers 12,36 comprise dry-break couplers in accordance with the preferred embodiments of the invention, leakage from either coupler is reduced or eliminated. The x-y coordinates of the coupler 12 associated with the next source tank of the recipe are then recalled from the memory of process controller 50, and actuator 28 and servo motor 40 are again activated to reposition carrier 30 and coupler 36 in alignment with the coupler 12 associated with that tank. This process is repeated until the desired quantities of liquid has been obtained from all source tanks for a given recipe. In similar manner, the robotic mechanism 22 can be programmed automatically to execute a wash and rinse sequence downstream of coupler 36 into a waste receiving tank. The system is now ready to execute the recipe for batch number two into an available processing tank 48.

Figure 5:
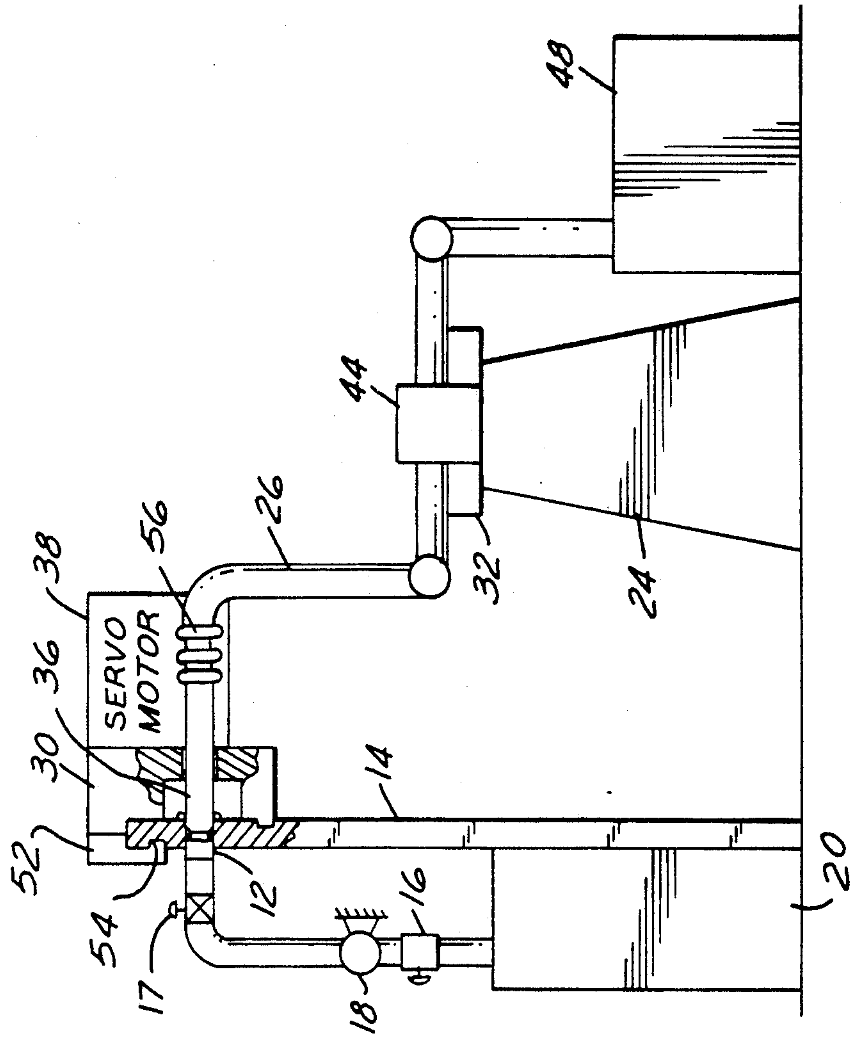
FIGS. 4 and 5 are respective end and side elevational views that schematically illustrate a modified embodiment of the invention.
Figure 4:
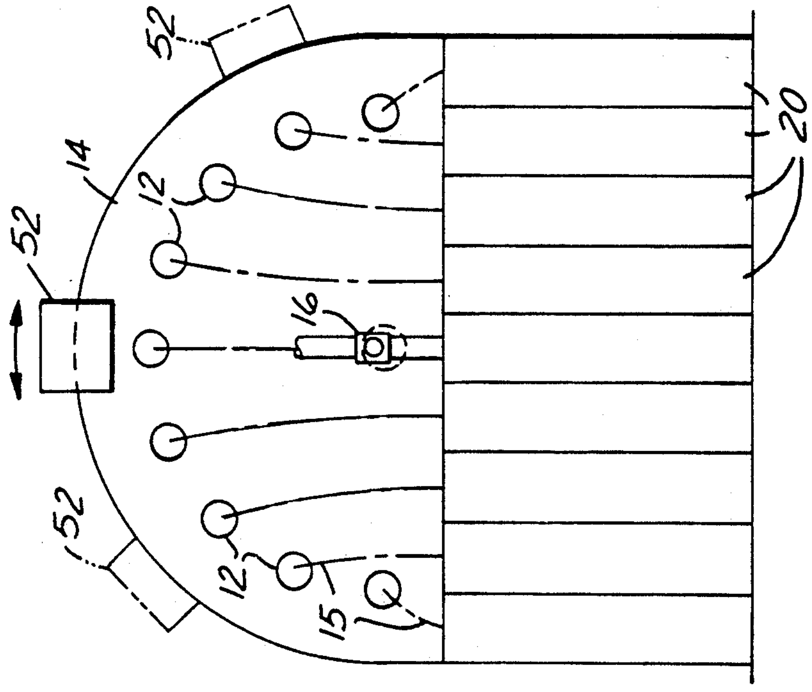

FIGS. 4 and 5 illustrate a modified embodiment of the invention in which couplers 12 are disposed in an arcuate array at constant radius on panel 14, and are individually connected to associated source tanks 20 as previously described. Guide arm 26 in the embodiment of FIGS. 4 and 5 is of fixed radial dimension corresponding to the constant radius of couplers 12 on panel 14, and is mounted to pivot on base 24 under control of servo motor 32. A rack and pinion actuator can be used in lieu of motor 32. Carrier 30 at the outer end of arm 26 in the embodiment of FIGS. 4 and 5 has a guide 52 that engages a track 54 on the periphery of panel 14 for supporting the outer end of arm 26 and helping to ensure alignment of coupler 36 with the couplers 12 on panel 14 and locking the couplers through servo motor 41. Preferably, arm 26 is hollow and forms part of the liquid flow path, being connected to coupler 36 by an expandable joint or bellows 56. Liquid is thereby fed through flow meter 44 to mixing/processing tank 48 from each coupler 12 and associated source tank 20 in the desired sequence.

Figure 6:
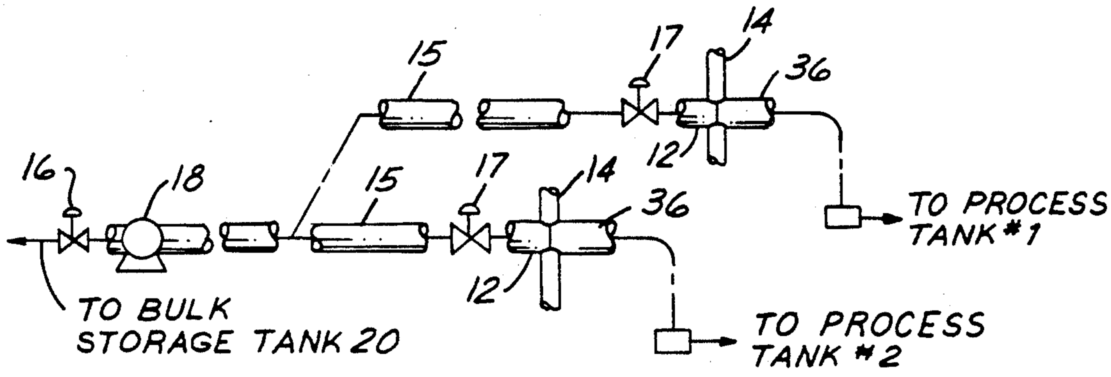
FIG. 6 is a schematic diagram of another modification to the present invention.

FIG. 6 illustrates a modified embodiment of the invention in which a bulk storage tank 20 and pump 18 are connected to couplers 12 on a plurality of differing panels 14 so that liquid from a single bulk storage tank may be fed to a plurality of mixing/processing tanks simultaneously. (Other source tanks 20 are connected to other couplers 12 on each panel 14, as previously described.) Pump 18 in the embodiment of the invention illustrated in FIG. 6 is operated at a speed suitable for feeding liquid to the number of processing tanks to which the bulk storage tank is connected—i.e., at a first rate when connected to only a single processing tank, at a second higher rate when connected two processing tanks, etc. such as in the case of operating two or more systems 10 simultaneously, yet independently, to fill two or more processing tanks 48 at the same time.

There is thus provided in accordance with the present invention a system that automatically and accurately transfers quantities of liquids in bulk storage vessels to mixing/processing tanks with minimal contamination with other liquids or with the surrounding environment. The transfer mechanism includes a terminal board at which the rigid or flexible conduits from the bulk storage tanks are fastened to first couplers disposed in a predetermined and fixed array. A computer-controlled robotic engagement device with an opposing coupler is disposed and operated for selective connection to the couplers on the terminal board in predetermined sequences programmed into a process controller/computer. All valves and couplers preferably are of the dry-break type, which minimizes or eliminates spillage and leakage during the coupling/decoupling operation. The coupler on the robotic mechanism is connected by suitable rigid or flexible conduits to the mixing or processing tanks.

When system liquids begin to flow, they are channeled through a measuring device, which is systematically controlled by the process controller/computer and by suitable control valves and pump controls to transfer the precise desired quantity of each liquid in sequence in accordance with the desired mixing or processing recipe. The liquids that pass through the measuring device are channeled through appropriate rigid or flexible conduits to a holding tank for further mixing or processing. The measuring device may be a volumetric or mass flow meter, a weighing system or load cell, liquid depth gauge, metering pump, etc., and can be located anywhere in the entire system for liquid quantity control purposes.

The robotic engagement device is process controller/computer controlled to locate a specific bulk-stored liquid coupler on the terminal board by specified coordinates, either x-y coordinates where the couplers are disposed in a rectilinear row-and-column array or angular coordinates where the couplers are disposed in an arcuate array at constant radius. (In a modification that combines these embodiments, the couplers are carried in multiple arcuate arrays at differing radii, and the control information comprises angle and radius coordinates.) When the movable coupler is at the desired coordinate location, the coupler is moved into secure coupling engagement with the fixed coupler. After appropriate safety checks, the process controller/computer actuates the pumps, valves, meters and/or other safety devices to transport the desired quantity of liquid from the bulk storage tank through the system to the desired holding tank for mixing or processing. After another appropriate delay period, the robotic mechanism is programmed to decouple from the first liquid coupler specified in the recipe, and to seek, couple, measure and deliver the second and subsequent liquids of the recipe. The various movable mechanisms may be controlled by electric servo motors, linear or rotary actuators, or other suitable integrated multi-motor/multi-axis robotic devices.

I claim:

1. An automatic liquid delivery system that comprises:

a plurality of first coupling means disposed in an array of predetermined geometry, liquid source means and means for receiving liquid from said system, means for connecting one of said liquid source means and said liquid-receiving means individually to said plurality of first coupling means, and means for automatically connecting the other of said liquid source means and said liquid-receiving means to said plurality of first coupling means in a predetermined sequence comprising second coupling means constructed for selective individual coupling engagement with each of said plurality of first coupling means, support means on which said second coupling means is mounted, motor means coupled to said support means for selectively moving said support means and said second coupling means carried thereby such that said second coupling means traverses said array, and control means connected to said motor means and to said second coupling means for connecting said second coupling means to said plurality of first coupling means in said predetermined sequence.

2. The system set forth in claim 1 wherein said support means comprises a base and an arm movably mounted on said base, said second coupling means being carried by said arm.

3. The system set forth in claim 2 wherein said support means further comprises means mounting said second coupling means for movement lengthwise of said arm.

4. The system set forth in claim 3 wherein said motor means comprises means for moving said arm linearly of said base.

5. The system set forth in claim 2 wherein said motor means comprises means mounting said arm to pivot on said base.

6. The system set forth in claim 2 further comprising means mounting said plurality of first coupling means in a planar array of said predetermined geometry.

7. The system set forth in claim 6 wherein said predetermined geometry is rectilinear; and wherein said motor means includes first motor means for selectively moving said arm along said base in a direction corresponding to one lineal dimension of said rectilinear array geometry and second motor means for selectively moving said second coupling means lengthwise of said arm in a direction corresponding to the other lineal dimension of said rectilinear array geometry.

8. The system set forth in claim 7 further comprising means coupled to said arm for moving said second coupling means into coupling engagement with said plurality of first coupling means in said array.

9. The system set forth in claim 6 wherein said predetermined geometry is arcuate, and wherein said motor means comprises first motor means for selectively pivoting said arm on said base such that said second coupling means on said arm travels in an arc that overlies said array.

10. The system set forth in claim 9 further comprising means coupled to said arm for moving said second coupling means into coupling engagement with first coupling means in said array.

11. The system set forth in claim 9 wherein said motor means comprises a multi-motor/multi-axis arm for moving said second coupling means into coupling engagement with said plurality of first coupling means in any said predetermined sequence.

12. The system set forth in claim 8 wherein said motor means comprises a multi-motor/multi-axis arm for moving said second coupling means into coupling engagement with said plurality of first coupling means in any said predetermined sequence.

13. The system set forth in claim 1 wherein said plurality of first coupling means and said second coupling means comprise dry-break coupling means.

14. The system set forth in claim 13 wherein said liquid source means comprises a plurality of liquid source vessels and means individually connecting each said vessel to a corresponding one of said plurality of first coupling means, said individually-connecting means being coupled to said control means for selective operation to supply liquid under pressure as commanded by said control means.

15. An automatic liquid delivery system that includes:

a plurality of first liquid coupling means and means mounting said plurality of first coupling means in a fixed positions in a planar array of predetermined geometry, a plurality of liquid tanks and a pump individually connecting each of said tanks to at least one of said plurality of first coupling means, means for receiving liquid from said system, and means for automatically connecting said liquid-receiving means to said plurality of first coupling means in a predetermined sequence so as to receive liquid in turn from predetermined ones of said liquid tanks, said automatically-connecting means comprising a base having an arm movably mounted thereon and first motor means connecting said arm to said base for moving said arm on said base in a direction corresponding to a dimension of said array, second coupling means mounted on said arm and spaced from said base so as to traverse said array as said arm is moved with respect to said base, second motor means coupled to said arm for positively coupling said second coupling means to a one of said plurality of first coupling means aligned therewith, and control means connected to said first and second motor means and to said pumps for sequentially moving said second coupling means among said plurality of first coupling means and coupling said second coupling means to said one of said plurality of first coupling means in a predetermined sequence and operating said pump means in said sequence to transfer liquid from said tanks, to said liquid-receiving means in said predetermined sequence and in predetermined amounts.

16. The system set forth in claim 15 further comprising means connected between said second coupling means and said liquid-receiving means and coupled to said control means for measuring quantity of iiquid transferred to said liquid-receiving means from each of said tanks.

* * * * *